United States Patent
Chang et al.

(10) Patent No.: US 11,596,019 B2
(45) Date of Patent: Feb. 28, 2023

(54) WIRELESS COMMUNICATION DEVICE AND METHOD

(71) Applicants: Sharp Kabushiki Kaisha, Osaka (JP); FG Innovation Company Limited, New Territories (HK)

(72) Inventors: Ningjuan Chang, Shanghai (CN); Renmao Liu, Shanghai (CN)

(73) Assignees: SHARP KABUSHIKI KAISHA, Sakai (JP); SHARP CORPORATION, Sakai (JP)

( * ) Notice: Subject to any disclaimer, the term of this patent is extended or adjusted under 35 U.S.C. 154(b) by 0 days.

(21) Appl. No.: 16/959,761

(22) PCT Filed: Dec. 26, 2018

(86) PCT No.: PCT/CN2018/123834
§ 371 (c)(1),
(2) Date: Jul. 2, 2020

(87) PCT Pub. No.: WO2019/134566
PCT Pub. Date: Jul. 11, 2019

(65) Prior Publication Data
US 2020/0374966 A1    Nov. 26, 2020

(30) Foreign Application Priority Data
Jan. 5, 2018  (CN) .......................... 201810013245.6

(51) Int. Cl.
*H04W 76/27* (2018.01)
*H04W 74/08* (2009.01)

(52) U.S. Cl.
CPC ....... *H04W 76/27* (2018.02); *H04W 74/0833* (2013.01)

(58) Field of Classification Search
None
See application file for complete search history.

(56) References Cited

U.S. PATENT DOCUMENTS 10,681,738 B2 * 6/2020 Babaei .............. H04W 74/0833
10,764,787 B2 * 9/2020 Lee ........................ H04W 76/27
(Continued)

FOREIGN PATENT DOCUMENTS

WO    WO-2008155688 A1 * 12/2008 ........ H04W 72/0406
WO    WO-2018185654 A1 * 10/2018 ........ H04W 72/1294
(Continued)

OTHER PUBLICATIONS

AsusTek "Consideration on Fallback of 2-step RACH Procedure" R2-1700024, dated Jan. 2017 (Year: 2017).*
(Continued)

*Primary Examiner* — Jamaal Henson
(74) *Attorney, Agent, or Firm* — Keating & Bennett, LLP

(57) ABSTRACT

The present disclosure provides a method performed by user equipment. The method comprises: transmitting a random access preamble for early data transmission (EDT) on a
(Continued)

physical random access channel resource for EDT; receiving a random access response (RAR); and performing fallback to a non-EDT procedure if it is determined according to an uplink grant in the received RAR that EDT transmission cannot be performed. Further provided is corresponding user equipment.

4 Claims, 3 Drawing Sheets

(56) References Cited

U.S. PATENT DOCUMENTS

| | | | | |
|---|---|---|---|---|
| 11,026,123 | B2* | 6/2021 | Lee | H04W 76/12 |
| 2010/0296467 | A1* | 11/2010 | Pelletier | H04L 5/0048 |
| | | | | 370/329 |
| 2012/0051297 | A1* | 3/2012 | Lee | H04W 74/006 |
| | | | | 370/329 |
| 2013/0016602 | A1* | 1/2013 | Diachina | H04W 72/0413 |
| | | | | 370/336 |
| 2018/0270869 | A1* | 9/2018 | Tsai | H04W 74/006 |
| 2018/0324854 | A1* | 11/2018 | Phuyal | H04W 74/085 |
| 2018/0324869 | A1* | 11/2018 | Phuyal | H04W 72/14 |
| 2019/0037447 | A1* | 1/2019 | Lee | H04W 28/18 |
| 2020/0068442 | A1* | 2/2020 | Lee | H04W 76/12 |
| 2020/0187245 | A1* | 6/2020 | Fujishiro | H04W 72/0413 |
| 2020/0236598 | A1* | 7/2020 | Kim | H04W 36/0079 |
| 2020/0288509 | A1* | 9/2020 | Park | H04W 74/0833 |
| 2020/0374934 | A1* | 11/2020 | Koskinen | H04W 76/27 |
| 2020/0383134 | A1* | 12/2020 | Tirronen | H04W 80/02 |

FOREIGN PATENT DOCUMENTS

| | | | | |
|---|---|---|---|---|
| WO | WO-2019082122 | A1 * | 5/2019 | H04W 72/1289 |
| WO | WO-2019097458 | A1 * | 5/2019 | H04W 76/18 |

OTHER PUBLICATIONS

Institute for Information Industry (III), "Fall-back Mode from Early Data Transmission", R2-1712315, Dec. 2017 (Year: 2017).*
Official Communication issued in International Patent Application No. PCT/CN2018/123834, dated Mar. 6, 2019.
Qualcomm Incorporated, "Discussion on some FFSes on EDT", 3GPP TSG-RAN WG2 Meeting #100, R2-1713713, Nov. 27-Dec. 1, 2017, 4 pages.
Qualcomm Incorporated, "Email discussion report: [99#45][NB-IoT/MTC] Early data transmission", 3GPP TSG-RAN WG2 Meeting #99bis, R2-1710888, Oct. 9-13, 2017, 42 pages.
Ericsson et al., "New WID on Even further enhanced MTC for LTE", 3GPP TSG RAN Meeting #75, RP-170732, Mar. 6-9, 2017, 4 pages.
Huawei et al., "New WID on Further NB-IoT enhancements", #3GPP TSG RAN Meeting #75, RP-170852, Mar. 6-9, 2017, 6 pages.

* cited by examiner

WIRELESS COMMUNICATION DEVICE AND METHOD

TECHNICAL FIELD

The present disclosure relates to the field of wireless communications technologies. More specifically, the present disclosure relates to a wireless communication device for small data transmission and a related method.

BACKGROUND

A new work item on further enhancement of NarrowBand Internet Of things (NB-IoT) (see RP-170852: New WID on Further NB-IoT enhancements) and a new work item on even further enhancement of machine type communication (MTC) (see non-patent literature: RP-170732: New WID on Even further enhanced MTC for LTE) was approved at the 3rd Generation Partnership Project (3GPP) RAN #75 plenary meeting held in March 2017. One of the goals of the two research projects is to enhance transmission for a small data packet service. A small amount of data (for example, 1000 bits) needs to be transmitted within a period of time in the small data packet service and can be completed through one transport block of a physical layer, whereas in the existing mechanism, data transmission can be completed only after completing connection with an air interface and entering an RRC connected state. As a result, large signaling overhead is required for transmitting small data packets, and a large amount of data of a user terminal in MTC or NB-IoT causes more severe signaling overhead. At the same time, the excessive signaling overhead also causes unnecessary energy consumption of the user terminal.

In order to enable transmission of small data packets with less signaling overhead and achieve power saving of a user terminal (User Equipment, UE), it is proposed in small data transmission enhancement of Release 15 that UE may not enter a radio resource control (RRC) connected state to perform data transmission. For example, small data may be transmitted together with a random access Msg3 in a random access procedure.

However, in some cases, the UE needs to fall back to a conventional data transmission procedure from the ongoing small data transmission procedure. That is, it is needed to enter the connected state through an RRC connection setup/resume procedure to perform data transmission. For example, since a network side buffers more data of the UE for transmission to the UE, the network side requires the UE to enter the RRC connected state from the ongoing small data transmission procedure to receive more downlink data. At this time, the UE needs to fall back to the conventional data transmission procedure.

SUMMARY

The present disclosure aims to provide a method for falling back to a conventional data transmission procedure from an ongoing small data transmission procedure and a corresponding device.

According to one aspect of the present disclosure, a method performed by user equipment is provided, comprising: transmitting a random access preamble for early data transmission (EDT) on a channel resource for EDT; receiving a random access response (RAR); and performing fallback to a non-EDT procedure if it is determined according to the received RAR that EDT transmission cannot be performed.

In an embodiment, the performing fallback to a non-EDT procedure comprises transmitting a first fallback indication to a radio resource control (RRC) layer by a medium access control (MAC) layer.

In an embodiment, the performing fallback to a non-EDT procedure comprises at least one of the following:
flushing data in a multiplexing and assembly entity by a medium access control (MAC) layer;
flushing data in a Msg3 buffer by the MAC layer; or
interrupting or suspending a current random access procedure by the MAC layer until an indication from an upper layer is received.

In an embodiment, the method further comprises at least one of the following:
when receiving the first fallback indication from the MAC layer, transmitting a second fallback indication to the MAC layer by the RRC layer;
when receiving the first fallback indication from the MAC layer, instructing, by the RRC layer, the MAC layer to replace data in a buffer with new data; or
when receiving the first fallback indication from the MAC layer, instructing, by the RRC layer, an RLC layer to re-establish an RLC entity.

In an embodiment, the performing fallback to a non-EDT procedure further comprises: starting a random access-contention resolution timer not for EDT after transmitting a Msg3.

In an embodiment, the performing fallback to a non-EDT procedure comprises at least one of the following:
suspending a data radio bearer (DRB) and a signaling radio bearer (SRB);
releasing all radio resource control (RRC) configurations;
clearing a Packet Data Convergence Protocol (PDCP) state;
re-establishing a PDCP entity; or
using a default configuration.

According to another aspect of the present disclosure, a method performed by user equipment is provided, comprising: transmitting a random access preamble for early data transmission (EDT) on a channel resource for EDT; performing EDT transmission; and performing fallback to a non-EDT procedure if a message indicating fallback to a non-EDT procedure is received.

In an embodiment, the performing fallback to a non-EDT procedure comprises performing a radio resource control (RRC) connection setup procedure.

In one embodiment, the performing fallback to a non-EDT procedure comprises at least one of the following:
releasing data radio bearer (DRB)(s) and a signaling radio bearer (SRB) (s);
releasing all radio resource control (RRC) configurations;
clearing a Packet Data Convergence Protocol (PDCP) state; or
using a default configuration.

According to another aspect of the present disclosure, user equipment is provided, comprising a processor and a memory. The memory is communicatively coupled to the processor. The memory has instructions stored thereon, and the instructions, when run by the processor, cause the user equipment to perform the method described herein.

BRIEF DESCRIPTION OF THE DRAWINGS

The above and other features of the present disclosure will become more apparent with the following detailed description in conjunction with the accompanying drawings.

DETAILED DESCRIPTION

Figure 1A:
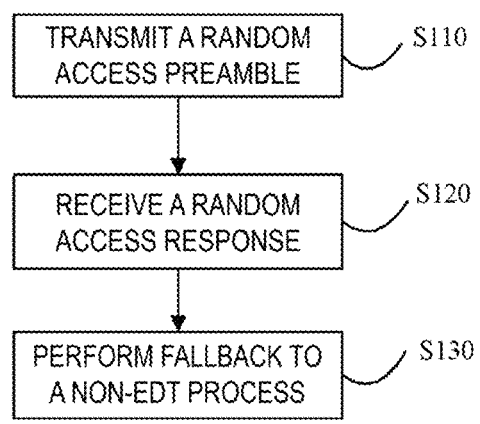
FIG. 1A is a flowchart of a method performed by user equipment according to an embodiment of the present disclosure.

According to the following detailed description of exemplary embodiments of the present disclosure made in conjunction with the accompanying drawings, other aspects, advantages, and prominent features of the present disclosure will become apparent to those skilled in the art.

In the present disclosure, the terms "include" and "comprise" and derivatives thereof mean inclusion without limitation; the term "or" may have an inclusive meaning and means "and/or."

In the present specification, the following various embodiments for describing the principles of the present disclosure are merely illustrative, and should not be interpreted in any way as limiting the scope of the disclosure. The following description with reference to the accompanying drawings is used to facilitate full understanding of the exemplary embodiments of the present disclosure defined by the claims and equivalents thereof. The following description includes a variety of specific details to facilitate understanding, but these details should be considered merely exemplary. Therefore, those of ordinary skill in the art should recognize that various changes and modifications may be made to the embodiments described herein without departing from the scope and spirit of the present disclosure. In addition, the description of the known function and structure is omitted for clarity and simplicity. In addition, the same reference numerals are used for similar functions and operations throughout the figures.

A plurality of embodiments according to the present disclosure are specifically described below by using an LTE mobile communication system and its subsequent evolved versions as an exemplary application environment. However, it is to be noted that the present disclosure is not limited to the following embodiments, but may be applied to more other wireless communication systems, such as an NB-IoT system or an MTC system, and may also be applied to a next-generation 5G wireless communication system (New Radio, NR).

The base station in the present disclosure may be a base station of any type, such as a Node B, an enhanced base station eNB, a base station gNB in a 5G communication system, a micro base station, a picocell base station, a macro base station, or a home base station; the cell may also be a cell covered by any type of base station described above.

Different embodiments may also be combined to operate.

Some concepts involved in the present disclosure are described below first. It is worth noting that some names in the following description are merely exemplary and illustrative and not limiting, and other names may be used.

Random Access Response (RAR): a second message in a random access procedure. After receiving a random access preamble of UE, a base station transmits a random access response message to respond to the reception of the random access preamble. The random access response message includes a timing advance field, an uplink grant field, a UE identifier field, and so on.

Msg3: a third message in a random access procedure. In the present disclosure, the Msg3 collectively refers to uplink transmission on an uplink resource indicated by an uplink grant that is included in an RAR by UE. The Msg3 not only can refer to third transmission in a contention-based random access procedure, but also can refer to first uplink transmission after a non-contention based-random access procedure.

Msg4: a downlink message for responding to a Msg3 in a random access procedure and transmitted to UE by a base station, where the UE performs random access contention resolution based on the message and determines whether the current random access succeeds.

User Plane Optimization Solution and Control Plane Optimization Solution:

in practice, communication systems before R15 already support two optimized data transmission solutions to reduce signaling overhead for data transmission and power consumption of UE, which are referred to as control plane cellular evolved packet service optimization (cp-CIoT-EPS-Optimization) and user plane cellular evolved packet service optimization (up-CIoT-EPS-Optimization). In the control plane cellular evolved packet service optimization solution, data on an application layer is included, as a non access stratum (NAS) data packet, on a signaling radio bearer (SRB) of a control plane for transmission. The signaling radio bearer refers to SRB1 or SRB1bis before R14. For example, after the UE completes a random access procedure, a NAS data packet is included in an RRC connection setup complete message for transmission. This optimization solution may be referred to as a control plane optimization solution or a control plane solution for short. In the user plane cellular evolved packet service optimization solution, still like data transmission in a conventional system, data on the application layer is transmitted on a data radio bearer ((user) Data Radio Bearer, DRB) in an RRC connected state, except that after the data transmission is completed, UE and an eNB suspend an RRC connection (indicated by an RRC connection release message including a suspend indication), store a UE context, and enter an RRC idle state. When the UE needs to perform data transmission, the UE initiates an RRC connection resume procedure to the eNB (in this procedure, the UE transmits an RRC connection resume request message to the base station to initiate connection resumption, the base station transmits an RRC connection resume message to the UE to instruct the UE to resume the RRC connection, and then the UE feeds back an RRC connection resume complete message to the base station to make a response). Since the UE and the eNB store the UE context, the RRC connection, the DRB and security can be resumed through the procedure without the need to re-setup the RRC connection, the DRB and security. This solution may also be referred to as a user plane optimization solution or a user plane solution for short. The RRC idle state in which the UE stores the UE context, despite being called an RRC idle state, can be actually viewed as an intermediate state between an RRC idle state and a connected state. This intermediate state can be considered as an RRC inactive state (RRC_inactive) as defined in a 5G NR system.

Early Data Transmission (EDT):

a small data transmission optimization solution in R15 is based on the aforementioned two optimization solutions and further optimizes characteristics of small data transmission. For uplink data transmission, optimization is mainly transmitting small data together with a Msg3 in a random access procedure. Since such optimization can complete data transmission at an earlier time than conventional data transmission, the data transmission is referred to as early data transmission. In the present disclosure, small data can be equivalent to early data. In a cell supporting the EDT optimization solution, a base station broadcasts, through system information, a physical random access resource such as a random access preamble used for initiating EDT, and a transport block size (TB S) threshold. The TBS threshold is configured for each enhanced coverage level (or coverage enhancement level). An EDT procedure is described briefly below:

1. When UE needs to perform uplink transmission, the UE judges whether an EDT condition is satisfied, for example, whether a TBS including a data packet is less than or equal to a TBS threshold corresponding to a current enhanced coverage level, and if yes, then the UE initiates a random access procedure on an EDT-specific physical random access channel resource (Physical Random Access Channel, PRACH) using an EDT-specific preamble;

2. A base station receives the EDT-specific preamble on the EDT-specific PRACH resource and recognizes that the UE is initiating an EDT procedure, then the base station assigns in an RAR an uplink grant that can be used for small data transmission;

3. After receiving the RAR, the UE judges whether the uplink grant in the RAR is sufficient to accommodate an entire small data packet, and if yes, then the UE includes small data in a Msg3 for uplink transmission together with an RRC message on a resource corresponding to the uplink grant; if not, then the UE falls back to a conventional non-EDT procedure, namely, does not include the small data packet in a Msg3 for transmission together. That is, only an RRC message is transmitted in the Msg3 to request RRC connection setup/resumption and hope to transmit data after the RRC connection setup/resumption; and 4. After the base station receives the Msg3 including the small data, if no additional data transmission exists, then the base station may transmit a Msg4 (for example, an RRC connection release message or an RRC EDT complete message) to inform the UE that data transmission has been completed and an RRC idle state can be maintained. If additional data needs to be transmitted based on a decision of a network side, then the base station may transmit another Msg4 (for example, RRC connection setup or RRC connection resume) to instruct the UE to enter an RRC connected state.

5. If the UE transmits the Msg3 including the small data in step 3 and receives the message 4 instructing the UE to enter the RRC connected state in step 4, then the UE falls back to the conventional non-EDT procedure and enters the RRC connected state. Otherwise, the UE considers that small data transmission is completed and resumes the RRC idle state.

In the EDT procedure, if the EDT procedure is based on the control plane solution, then user data is included in an RRC message and transmitted through SRB0. If the EDT procedure is based on the user plane solution, then user data and an RRC message are multiplexing and assembled on a medium access control (MAC) layer to form the same MAC protocol data unit (PDU) for transmission. The user data is transmitted through a DRB and the RRC message is transmitted through SRB0. This requires that when triggering the EDT procedure, the UE should resume (or (re)activate) the DRB(s) and security and apply a radio configuration before RRC suspension to various protocol layers.

Based on the above, the UE performs fallback in the following three cases:

case 1: the Msg4 received by the UE (in the aforementioned step 4 or 5) is an RRC connection setup message, which instructs the UE to setup a new RRC connection;

case 2: the Msg4 received by the UE (in the aforementioned step 4 or 5) is an RRC connection resume message, which instructs the UE to resume a previous RRC connection;

case 3: the size of the uplink grant in the RAR received by the UE (in the aforementioned step 3) is insufficient to accommodate an entire transport block including the small data packet. Preferably, the entire transport block including the small data packet refers to the entire transport block including small data and the RRC message in the Msg3 and a corresponding MAC header. Alternatively, the entire transport block including the small data packet refers to a small data Packet Data Convergence Protocol (PDCP) service data unit (SDU) or a PDCP PDU and the RRC message.

The following embodiments are mainly described based on the aforementioned fallback cases, but it should be noted that the following embodiments still apply in other cases. For example, fallback from EDT to non-EDT is performed during RRC connection reestablishment. At this time, the aforementioned RRC connection setup request or RRC connection resume request message may be replaced with an RRC connection reestablishment request message, the RRC connection setup or RRC connection resume message may be replaced with an RRC connection reestablishment message, and the RRC connection setup complete or RRC connection resume complete message may be replaced with an RRC connection reestablishment complete message.

In the following embodiments of the present disclosure, indication/notification or inform/information are interchangeable. UE may include NB-IoT UE, bandwidth reduced low complexity UE, UE under enhanced coverage, and other UE (for example, 5G NR UE).

FIG. 1A is a flowchart of a method performed by user equipment according to an embodiment of the present disclosure.

Step S110: user equipment (UE) transmits a random access preamble for early data transmission (EDT) on a channel resource for EDT.

Step S120: the user equipment (UE) receives a random access response "RAR."

Step S130: perform fallback to a non-EDT procedure if the user equipment (UE) determines according to the received RAR that EDT transmission cannot be performed.

For example, a medium access control (MAC) layer may transmit a first fallback indication to a radio resource control (RRC) layer. In this case, when receiving the first fallback indication from the MAC layer, the RRC layer may transmit a second fallback indication to the MAC layer, or the RRC layer may instruct the MAC layer to replace data in a buffer with new data, or the RRC layer may instruct an RLC layer to re-establish an RLC entity.

Alternatively, the performing fallback to a non-EDT procedure may include flushing data in a multiplexing and assembly entity by a medium access control (MAC) layer. Alternatively, the MAC layer may flush data in a Msg3 buffer. Alternatively, the MAC layer may interrupt or suspend a current random access procedure until an indication from an upper layer is received.

Alternatively, the performing fallback to a non-EDT procedure may include at least one of the following: suspending data radio bearer (DRB)(s) and a signaling radio bearer (SRB) (s); releasing all radio resource control (RRC) configurations; clearing Packet Data Convergence Protocol (PDCP) states; re-establishing a PDCP entity; or using a default configuration.

Preferably, the performing fallback to a non-EDT procedure may further include: starting a random access-contention resolution timer not for EDT after transmitting a Msg3.

Details of the method shown in FIG. 1A are illustrated in detail below through Exemplary Scenarios 1 and 2.

Exemplary Scenario 1

Exemplary Scenario 1 may be applied to, for example, the aforementioned fallback case 3. Preferably, when UE currently in an EDT procedure receives an RAR, and when an uplink grant (UL grant) included in the RAR is insufficient to accommodate entire data to be transmitted, the UE performs the following operation. The "entire data to be transmitted" may be a total amount of data to be transmitted in an uplink buffer plus a corresponding MAC header (or MAC subheader) thereof, including an RRC message (namely, SRB data) from an upper layer carried on a common control channel (CCCH) and/or user plane data (namely, DRB data) on a dedicated control channel (Dedicated Traffic Channel, DTCH). Alternatively, the "entire data to be transmitted" may be a PDCP SDU or PDCP PDU to be transmitted in the uplink buffer. The "entire data to be transmitted" may also refer to a NAS PDU for the control plane solution. The "currently in an EDT procedure" may be further understood as that a random access preamble in a random access procedure is selected by a MAC entity and used for early data (transmission).

In this exemplary scenario, the UE may fall back to a non-EDT random access procedure and/or RRC connection setup/resume procedure, and enter an RRC connected state using the conventional non-EDT random access procedure or RRC connection setup/resume procedure to perform data transmission. This exemplary scenario may be applied to the control plane solution and the user plane solution. Specifically, when the UE performs fallback, the UE may first perform one or more of the following operations:

Operation 1: a MAC layer of the UE indicates a first fallback indication to the upper layer.

The first fallback indication is also referred to as an "EDT failure indication" or "EDT not applicable/not appropriate" indication used by the MAC layer to notify the upper layer that EDT cannot proceed.

Operation 2: the MAC layer flushes data in a multiplexing and assembly entity.

Preferably, operation 2 may be performed in the case that the RAR is a first RAR successfully received in the current random access procedure. The data in the multiplexing and assembly entity is the RRC message (namely, SRB data) from the upper layer carried on the common control channel and/or user plane data (namely, DRB data) on the dedicated control channel. Preferably, operation 2 is performed in the control plane solution.

Operation 3: the MAC layer flushes (data in) a Msg3 buffer.

Preferably, operation 3 may be performed in the case that the RAR is not a first RAR successfully received in the current random access procedure.

Operation 4: the MAC interrupts/suspends the current RA until an indication from the upper layer is received.

Operation 4 may also be described as that the MAC delays transmission of a Msg3 until a second fallback indication from the upper layer is received, or operation 4 may also be described as that the MAC waits until a second fallback indication from the upper layer is received. The second fallback indication is used for instructing a lower layer to fall back to a non-EDT operation. To be more precise, the second fallback indication is used for instructing the MAC layer to (continue to) perform the random access procedure in a non-EDT operation mode or for instructing an RLC layer to re-establish an RLC entity. In this operation, the MAC continues with (the subsequent operation of) the current random access procedure only after receiving the second fallback indication from the upper layer. The subsequent operation may be, for example, setting a TC-RNTI as a value received in the RAR, or acquiring a MAC PDU to be transmitted from the multiplexing and assembly entity, and storing the MAC PDU in the Msg3 buffer.

After operation 1 is performed, one or more of the following operations 5 to 7 may further be performed:

Operation 5: when receiving the first fallback indication from the lower layer, an RRC performs a fallback operation, namely, performs an operation of falling back to a procedure not using EDT, including indicating a second fallback indication to the lower layer.

Operation 6: when receiving the first fallback indication from the lower layer, the RRC performs a fallback operation, namely, performs an operation of falling back to a procedure not using EDT, instructing the lower layer to replace data in the buffer with new data.

Operation 7: when the first fallback indication from the lower layer is received, an operation of falling back to a procedure not using EDT is performed, where the RRC instructs the lower layer to re-establish a lower layer entity. Preferably, operation 7 is performed if the UE is using the control plane solution or has submitted an RRC early data transmission request to a lower layer for transmission. Preferably, the lower layer may be the RLC layer.

After operation 5 or 7 is performed, the following operation 8 may further be performed.

Operation 8: when receiving the re-establishment indication or the second fallback indication of the RRC layer, the RLC re-establishes the RLC entity.

After operation 6 is performed, the following operation 9 may further be performed.

Operation 9: the MAC entity replaces data in the buffer with new data received from the upper layer.

Preferably, the following operation 10 may further be performed.

Operation 10: once a Msg3 is transmitted, the MAC layer can start a random access-contention resolution timer (ra-contentionresolutionTimer). The random access-contention resolution timer refers to a contention resolution timer of a random access procedure not for EDT. The premise here is that the system defines two random access-contention resolution timers, one used in an EDT random access procedure, and the other used in a non-EDT random access procedure. This operation refers to the latter.

In this exemplary scenario, the lower layer may be the MAC layer or the RLC layer or a PDCP layer, and the upper layer may be the RRC layer. In the control plane solution, an RLC/PDCP entity corresponding to an SRB more specifically refers to an RLC/PDCP entity corresponding to SRB0. In the user plane solution, an RLC/PDCP entity may be an RLC/PDCP entity corresponding to an SRB or a DRB.

In an example, the RAR may be an RAR in a contention-based random access procedure. That is, when performing the aforementioned operation, the UE needs to judge that the current random access procedure is a contention-based random access procedure, for example, when the random access preamble in the random access procedure is selected by the MAC entity, or the random access preamble is explicitly assigned (for example, explicitly assigned through ra-PreambleIndex) but is not all zeros (for example, 000000).

Exemplary Scenario 2

Exemplary Scenario 2 may be applied to the aforementioned fallback case 3. Preferably, when UE currently in an EDT procedure receives an RAR, and when an uplink grant (UL grant) included in the RAR is insufficient to accommodate entire data to be transmitted, the UE performs the following operation. The "entire data to be transmitted" may be a total amount of data to be transmitted in an uplink buffer plus a corresponding MAC header (or MAC subheader) thereof, including an RRC message (namely, SRB data) from an upper layer carried on a common control channel and/or user plane data (namely, DRB data) on a dedicated control channel. Alternatively, the "entire data to be transmitted" may be a PDCP SDU or PDCP PDU to be transmitted in the uplink buffer, and may also refer to a NAS PDU for the control plane solution. The "currently in an EDT procedure" may be further understood as that a random access preamble in a random access procedure is selected by a MAC entity and used for early data (transmission).

In this exemplary scenario, the UE may fall back to a non-EDT random access procedure and/or RRC connection resume procedure, and enter an RRC connected state using the conventional non-EDT random access procedure or RRC connection resume procedure to achieve data transmission. This exemplary scenario may be applied to the user plane solution.

Specifically, when the UE performs fallback (namely, performs an operation of falling back to a procedure not for EDT), UE RRC may perform one or more of the following operations:

Operation 1: suspend DRBs and SRBs.

The DRBs refer to all DRBs or all activated DRBs, and the SRBs refer to all SRBs or all SRBs not including SRB0.

Operation 2: release all RRC configurations.

When the UE is using the user plane solution, the "release all RRC configurations" refers to releasing stored radio resource configurations that are recovered when an EDT procedure is triggered, for example, an RLC layer configuration and a PDCP layer configuration. The "release" may also be understood as not using. That is, the "release" does not mean releasing a UE context that is saved by the UE, which means that the UE still retains the stored UE context. The "RRC configuration" may also be equivalent to a radio configuration or a radio resource configuration.

Operation 3: clear a PDCP state.

The PDCP state may be a RObust Header Compression (ROHC) state, a PDCP sequence number state, or a PDCP super-frame number.

Operation 4: re-establish a PDCP entity.

Preferably, the PDCP entity may refer to a PDCP entity corresponding to a DRB and/or PDCP entity corresponding to an SRB.

Operation 5: use a default configuration specified in a protocol.

For example, one or more of the following may be used: a default physical layer channel configuration (defined in Chapter 9.2.4 of Specification 36.331 in the LTE protocol) is used, a default semi-persistent scheduling configuration (defined in Chapter 9.2.3 of Specification 36.331 in the LTE protocol) is used, a default MAC layer configuration (defined in Chapter 9.2.2 of Specification 36.331 in the LTE protocol) is used, and so on.

Preferably, when the UE is using the user plane solution or has submitted an RRC connection resume message to a lower layer for transmission, the UE or the UE RRC may perform the operation in this exemplary scenario.

Figure 1B:
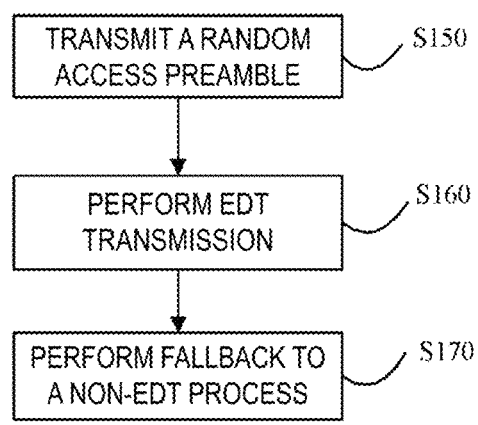
FIG. 1B is a flowchart of a method performed by user equipment according to an embodiment of the present disclosure.

FIG. 1B is a flowchart of a method performed by user equipment according to an embodiment of the present disclosure.

Step S150: user equipment (UE) transmits a random access preamble for early data transmission (EDT) on a channel resource for EDT.

Step S160: the user equipment (UE) performs EDT transmission.

Step S170: perform fallback to a non-EDT procedure if the user equipment (UE) receives a message indicating fallback to a non-EDT procedure.

For example, the performing fallback to a non-EDT procedure may include performing a radio resource control (RRC) connection setup procedure.

Alternatively, the performing fallback to a non-EDT procedure may include at least one of the following: releasing data radio bearer (DRB)(s) and signaling radio bearer (SRB) (s); releasing all radio resource control (RRC) configurations; clearing Packet Data Convergence Protocol (PDCP) states; or using a default configuration.

Details of the method shown in FIG. 1B are illustrated in detail below through Exemplary Scenario 3.

Exemplary Scenario 3

Exemplary Scenario 3 may be applied to the aforementioned fallback case 1. Preferably, the following operation may be performed when an RRC message included in a Msg4 that is received by UE currently in an EDT random access procedure is an RRC connection setup message. The "currently in an EDT procedure" may be further understood as that a random access preamble in a random access procedure is selected by a MAC entity and used for early data (transmission).

Through this exemplary scenario, the UE can fall back to a non-EDT RRC procedure and perform corresponding operations of a conventional non-EDT RRC setup procedure and enter an RRC connected state. This exemplary scenario may be applied to the user plane solution.

Specifically, when the UE performs fallback (namely, performs an operation of falling back to a procedure not for EDT), UE RRC may perform one or more of the following operations:

Operation 1: release DRBs and SRBs.

The DRBs refer to all DRBs or all activated DRBs, and the SRBs refer to all SRBs or all SRBs not including SRB0.

Operation 2: release all RRC configurations.

When the UE is using the user plane solution, the "release all RRC configurations" refers to releasing stored radio resource configurations that are recovered when an EDT procedure is triggered, for example, an RLC layer configuration and a PDCP layer configuration. The "release" may also be understood as not using, namely, including releasing a UE context stored by the UE. The "RRC configuration" may also be equivalent to a radio configuration or a radio resource configuration.

Operation 3: clear a PDCP state.

The PDCP state may be a RObust Header Compression (ROHC) state, a PDCP sequence number state, or a PDCP super-frame number.

Operation 4: use a default configuration specified in a protocol.

For example, one or more of the following may be included: a default physical layer channel configuration (defined in Chapter 9.2.4 of Specification 36.331 in the LTE protocol) is used, a default semi-persistent scheduling configuration (defined in Chapter 9.2.3 of Specification 36.331 in the LTE protocol) is used, a default MAC layer configuration (defined in Chapter 9.2.2 of Specification 36.331 in the LTE protocol) is used, and so on.

Preferably, when the UE is using the user plane solution or when the received RRC connection setup message is a response to an RRC connection resume request message used in an EDT procedure, the UE RRC may perform the operation in this exemplary scenario.

Figure 2:
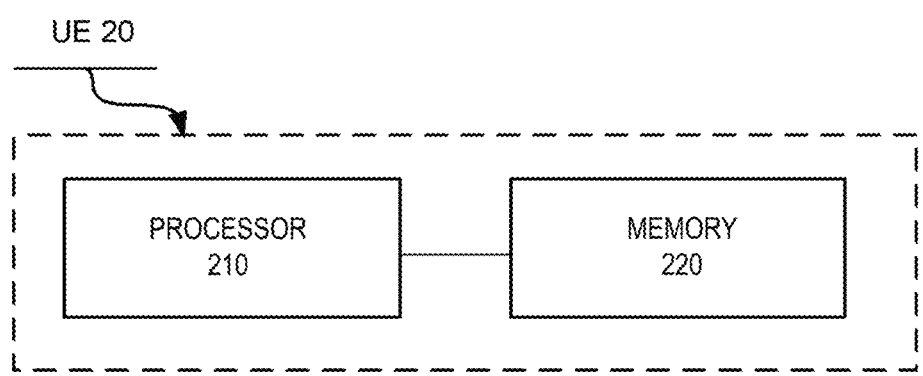
FIG. 2 is a block diagram of user equipment according to an embodiment of the present disclosure.

FIG. 2 is a block diagram of user equipment (UE) 20 according to an embodiment of the present disclosure. As shown in FIG. 2, the UE 20 includes a processor 210 and a memory 220. The processor 210 may include, for example, a microprocessor, a microcontroller, or an embedded processor. The memory 220 may include, for example, a volatile memory (for example, a random access memory (RAM)), a hard disk drive (HDD), a non-volatile memory (for example, a flash memory), or other memories. Program instructions are stored on the memory 220. The instructions, when run by the processor 210, can perform the aforementioned method performed by user equipment (for example, the method shown in FIG. 1A to FIG. 1B) described in detail in the present disclosure.

The program running on the device according to the present disclosure may be a program that enables a computer to implement the functions of the embodiments of the present disclosure by controlling a central processing unit (CPU). The program or information processed by the program may be temporarily stored in a volatile memory (for example, a random access memory (RAM)), a hard disk drive (HDD), a non-volatile memory (for example, a flash memory), or other memory systems.

The program for implementing the functions of the embodiments of the present disclosure may be recorded on a computer-readable recording medium. The corresponding functions can be achieved by the computer system through reading programs recorded on the recording medium and executing them. The so-called "computer system" herein may be a computer system embedded in the device, which may include an operating system or hardware (for example, peripherals). The "computer-readable recording medium" may be a semiconductor recording medium, an optical recording medium, a magnetic recording medium, a recording medium for programs that are dynamically stored for a short time, or any other computer-readable recording medium.

Various features or functional modules of the device used in the above embodiments may be implemented or executed through circuits (for example, monolithic or multi-chip integrated circuits). Circuits designed to execute the functions described in this description may include general-purpose processors, digital signal processors (DSPs), application-specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, controller, microcontroller, or state machine. The circuit may be a digital circuit or an analog circuit. When new integrated circuit technologies that replace existing integrated circuits emerge because of the advances in semiconductor technology, one or a plurality of embodiments of the present disclosure may also be implemented using these new integrated circuit technologies.

Furthermore, the present disclosure is not limited to the embodiments described above. Although various examples of the described embodiments have been described, the present disclosure is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present disclosure have been described in detail above with reference to the accompanying drawings. However, the specific structures are not limited to the above embodiments. The present disclosure also includes any design modifications that do not depart from the substance of the present disclosure. In addition, various modifications can be made to the present disclosure within the scope of the claims. Embodiments resulting from the appropriate combinations of the technical means disclosed in different embodiments are also included within the technical scope of the present disclosure. In addition, components with the same effect described in the embodiments above may be replaced with one another.

The invention claimed is:

1. A method performed by user equipment, the method comprising:
    performing transmission of a preamble for early data transmission (EDT) on a physical random access channel resource configured for EDT;
    receiving a random access response (RAR); and
    in a case that an uplink (UL) grant provided in the received RAR is not for EDT, performing, without performing transmission of another preamble, the following:
        flushing a msg3 buffer;
        acquiring a MAC PDU to be transmitted from a multiplexing and assembly entity; and
        storing the MAC PDU in the msg3 buffer.

2. A user equipment, comprising:
    a processor; and
    a memory, communicatively coupled to the processor, the memory having instructions stored thereon, wherein the instructions, when run by the processor, cause the user equipment to:
    perform transmission of a preamble for early data transmission (EDT) on a physical random access channel resource configured for EDT;
    receive a random access response (RAR); and
    in a case that an uplink (UL) grant provided in the received RAR is not for EDT, performing, without performing transmission of another preamble, the following:
        flush a msg3 buffer;
        acquire a MAC PDU to be transmitted from a multiplexing and assembly entity; and
        store the MAC PDU in the msg3 buffer.

3. A method performed by a base station, the method comprising:
    receiving, from user equipment, a preamble for early data transmission (EDT) on a physical random access channel resource configured for EDT; and
    transmitting, to the user equipment, a random access response (RAR) including an uplink (UL) grant which is not for EDT, thereby causing the user equipment to perform, without performing transmission of another preamble, the following:
        flush a msg3 buffer;
        acquire a MAC PDU to be transmitted from a multiplexing and assembly entity; and
        store the MAC PDU in the msg3 buffer.

4. A base station, comprising:

a processor; and a memory, communicatively coupled to the processor, the memory having instructions stored thereon, wherein the instructions, when run by the processor, cause the base station to:

receive, from user equipment, a preamble for early data transmission (EDT) on a physical random access channel resource configured for EDT; and transmit, to the user equipment, a random access response (RAR) including an uplink (UL) grant which is not for EDT, thereby causing the user equipment to perform, without performing transmission of another preamble, the following:

flush a msg3 buffer;

acquire a MAC PDU to be transmitted from a multiplexing and assembly entity; and store the MAC PDU in the msg3 buffer.

* * * * *